July 5, 1960
W. M. EATON ET AL
2,943,901
PORTABLE PROTECTIVE APPARATUS FOR
CASH REGISTERS AND THE LIKE
Filed April 18, 1956
2 Sheets-Sheet 1
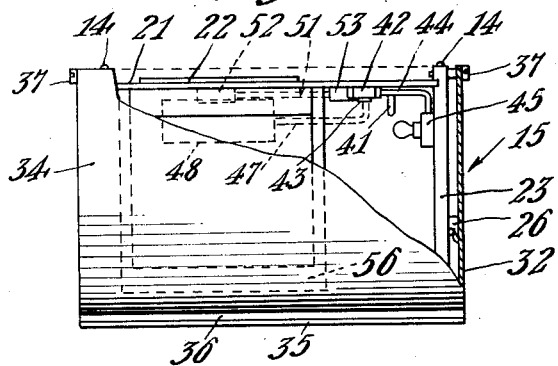
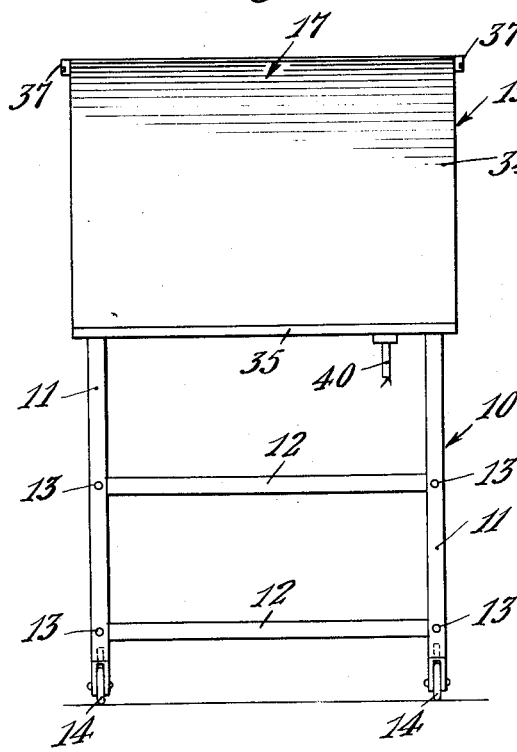
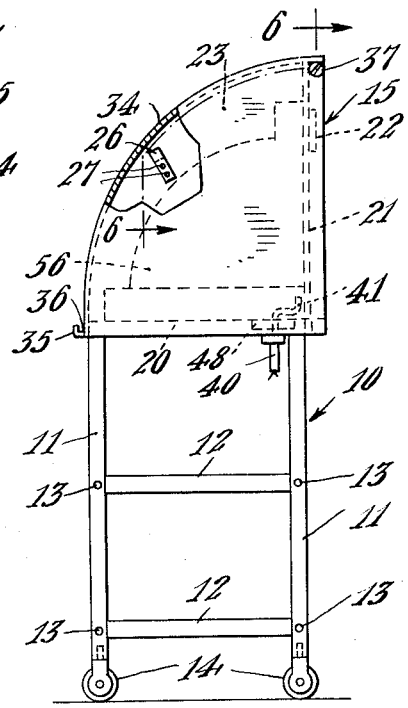
INVENTORS
WILLIAM M. EATON
GEORGE A. SPORN
BY
F. J. Pisarra
ATTORNEY July 5, 1960
W. M. EATON ET AL
2,943,901
PORTABLE PROTECTIVE APPARATUS FOR
CASH REGISTERS AND THE LIKE
Filed April 18, 1956
2 Sheets-Sheet 2
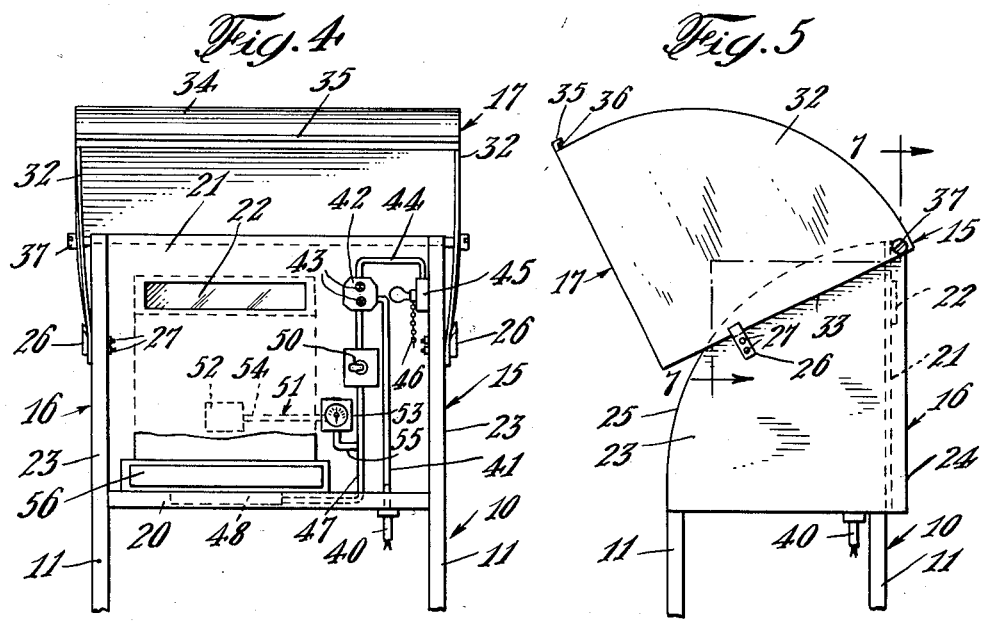
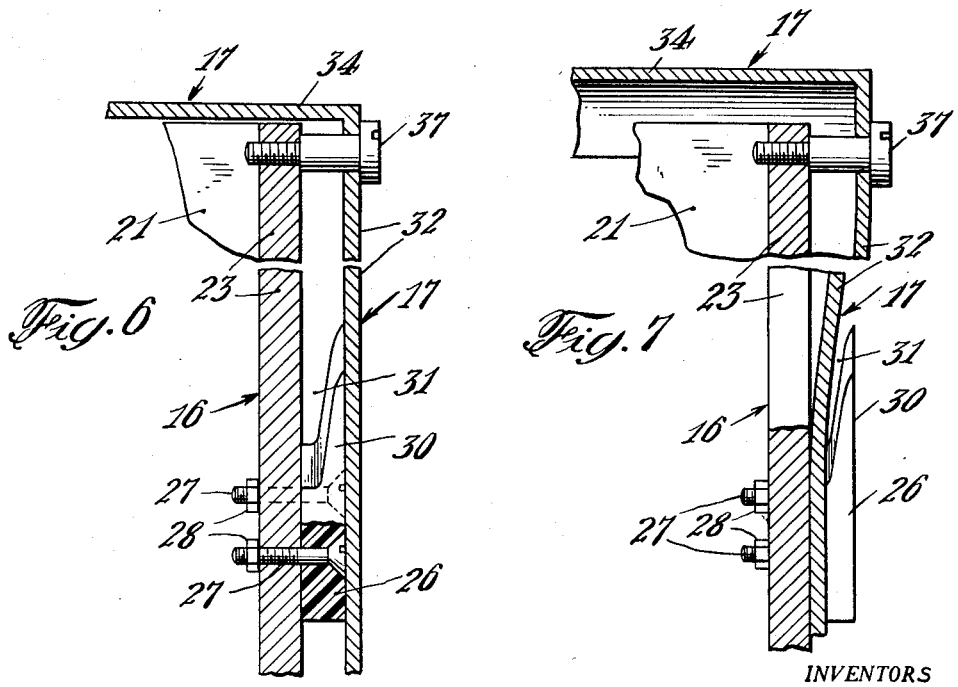
INVENTORS
WILLIAM M. EATON
GEORGE A. SPORN
BY
*F. J. Pisarra*
ATTORNEY

United States Patent Office 2,943,901
Patented July 5, 1960

2,943,901

PORTABLE PROTECTIVE APPARATUS FOR CASH REGISTERS AND THE LIKE

William M. Eaton and George A. Sporn, Fair Lawn, N.J., assignors to Cash Control Cover Corp., Fair Lawn, N.J., a corporation of New Jersey Filed Apr. 18, 1956, Ser. No. 578,955

2 Claims. (Cl. 312—229)

This invention relates to a portable protective unit. The invention pertains, in one of its more specific aspects, to apparatus that is readily movable from one location to another and that is adapted to afford adequate weather protection to mechanical or electro-mechanical equipment and to insure proper functioning of the moving parts of such equipment under relatively low temperature use conditions.

The invention has wide application. It is particularly useful in respect to present day mechanical and electro-mechanical cash registers that are employed out of doors for convenience and efficiency in conducting various business activities, such as the operation of an automobile service station.

There are many automobile service stations that are equipped with a plurality of gasoline dispensing pumps arranged singly or in groups at substantial distances from the usual central building of the station. It has long been recognized that the operators of such stations can render quicker and more efficient service to customers if cash registers are located at or near particular pumps or groups of pumps, as required by business activity, thereby eliminating the necessity of the operators walking to and from the central building to record payment and/or make change for each transaction. It has not been feasible heretofore to locate cash registers and related equipment at or near particular pumps for several reasons. For one thing, the cash registers may be damaged by wind-borne dust, rain, snow and similar weather disturbances. Another difficulty is that conventional cash registers do not usually function properly under low temperature conditions of use due to the lubricants, which are applied to the moving parts thereof, becoming so viscous as to render the connections between such parts undesirably "stiff" and, at times, inoperative. Moreover, if the cash registers are provided with standard recording means, such means can not operate properly at low temperatures for the reason that they are designed to function under normal room temperature conditions.

The apparatus of this invention eliminates the difficulties experienced in the past and affords additional worthwhile benefits as will be evident from the detailed description appearing further along herein.

One of the outstanding features of the invention resides in the fact that our apparatus may be readily moved from one outdoor location to another, as required by business activity. The apparatus has its parts so constructed and arranged as to protect the cash register and the operator from the weather and at the same time insure proper functioning of the cash register under relatively low temperature conditions. The apparatus may be quickly repositioned at a selected location, as required by changes in the weather, to afford proper protection against prevailing winds, rain, snow and the like.

The primary object of the invention is to afford adequate weather protection to various items of mechanical and electro-mechanical equipment when employed out of doors and to insure proper functioning of such equipment under low temperature use conditions.

Another object of the invention is to provide a portable apparatus for cash registers and the like, the apparatus being adapted to be readily moved from one outdoor location to another, as desired, and positioned in a selected location so as to efficiently protect the cash register and shelter the operator from wind, rain, sleet and snow.

A further object of the invention is to provide portable cash register protective apparatus that is adapted to supply sufficient controlled heat under low temperature conditions of use, whereby to insure proper functioning of the moving parts of the cash register.

A still further object of the invention is to provide apparatus of the character indicated that is simple in design; that is sturdy and light-weight in construction; that is reasonable in manufacturing, operating and maintenance costs; that is readily movable from place to place and that is capable of performing its intended functions in an entirely satisfactory and trouble-free manner.

To the end that the foregoing objects may be attained, a preferred and recommended apparatus according to this invention includes a stand mounted on casters to permit its being readily moved from one outdoor location to another. The stand carries a housing comprising a case and a hood. The case is open at the front and has a bottom wall, a rear wall and a pair of spaced upstanding side walls. The bottom wall of the case may also serve as the top of the stand. The hood is open at the bottom and back and has a pair of spaced upstanding side walls and a front wall. The hood side walls are disposed outside the case side walls and the hood front wall extends across the case open front when the hood is in closed position relative to the case. The hood is pivotally connected to the case to permit its being swung forwardly and upwardly to raised position relative to the case and afford access to the cash register. When in raised position, the hood projects forwardly of the stand to protect the cash register and shelter the operator from wind, rain, snow and other adverse weather conditions. The parts of the hood and case are so constructed and arranged as to effectively prevent rain, snow or the like from entering the housing when the hood is in either closed or raised position. The apparatus includes a means for releasably maintaining the hood in raised position relative to the case.

The bottom wall of the case carries an electric heating unit for supplying necessary heat under low temperature conditions whereby to maintain the moving parts of the cash register in proper working order. The heat supplied by the heating unit is transmitted through the bottom of the cash register and thence into its interior. A temperature responsive means, such as a thermostatic control, is connected to the heating unit and to the cash register. This means automatically places the heating unit out of active service when the interior of the cash register attains a predetermined temperature. In this manner, we prevent damage to internal parts of the cash register and/or charring of papers or money within the cash register due to temperature becoming excessive.

The enumerated objects and additional objects, together with the advantages of the invention, will be readily understood by persons skilled in the art from the following detailed description taken in conjunction with the annexed drawings which respectively describe and illustrate a preferred embodiment of the invention.

In the drawings:

Fig. 1 is a top plan view of apparatus constructed in accordance with the invention, parts being broken away for better illustration of other parts;

Fig. 2 is a view in front elevation of the apparatus shown in Fig. 1;

Fig. 3 is a view in side elevation of the apparatus shown in Figs. 1 and 2, a portion of the hood being broken away for better illustration;

Fig. 4 is a view corresponding to the upper portion of Fig. 2 and shows the parts in another relative position;

Fig. 5 is a side elevation view of Fig. 4;

Fig. 6 is a view in enlargement taken along staggered line 6—6 of Fig. 3; and

Fig. 7 is an enlarged view taken along staggered line 7—7 of Fig. 5.

Referring now to the drawings wherein like reference numerals identify corresponding parts throughout the several views, a stand 10 includes four spaced vertical angle iron legs 11 and a plurality of vertically spaced shelves 12, preferably made of sheet metal and secured to the legs by bolts 13. Attached to the lower ends of legs 11 are swivel casters 14 which serve as rollers to permit ready movement of the stand from one location to another, as desired.

A housing 15 is mounted on the stand and consists of a case 16 and a hood 17 that are also preferably made of metal. It is to be borne in mind that the housing parts may be made of any other suitable material or combination of materials known to the art, such as natural wood, composition board and appropriate synthetic plastics. The casing is rigidly secured to the top of the stand in any desired manner. The hood is carried by and is pivotal with respect to the case as will be described below.

Case 16 is open at the front. The case has a bottom wall 20, which also serves as the top wall of the stand, a vertical rear wall 21, having a horizontal window 22, and a pair of spaced-apart parallel vertical side walls 23 that are normal to the rear wall. The back edge 24 of each side wall 23 is located rearward of rear wall 21, as shown in Fig. 5. The front edge 25 of each side wall is curved. Each side wall has the general configuration of a sector of a circle. A retaining device or bracket 26 is affixed against the outer surface of each side wall by bolts 27 and nuts 28. Each device 26 includes an element 30 in the nature of a tapered finger that is spaced from its side wall, as indicated at 31 in Fig. 6.

Hood 17 is open at the bottom and back and includes a pair of spaced parallel side walls 32, each having a back edge 33. The hood side walls are substantially the same in size and configuration as the case side walls as will be evident from an examination of Fig. 5. The hood side walls are flexible and are positioned outside the corresponding case side walls, as illustrated in various views. The hood also includes a curved combined front and top wall 34. The upper end portion of wall 34 projects over and beyond case rear wall 21 whether the hood is in closed position with respect to the case (Fig. 3) or in raised position with respect to the case (Fig. 5). Integral with the lower end of wall 34 is a forwardly and upwardly projecting extension 35 that defines a trough or gutter 36 for draining rain water and the like to the sides of the hood.

Hood 17 is pivotally connected to case 16 by a pair of coaxial studs 37. As illustrated in Figs. 6 and 7, each stud 37 extends through the upper corner portion of a hood side wall 32 and threadedly engages the corresponding portion of the adjacent case side wall. The hood is adapted to be swung forwardly and upwardly about its pivotal connection with the case from closed position (Fig. 3) to open or raised position (Fig. 5). When the hood is raised from closed to open position, it is swung upwardly until its edges 33 clear retaining devices 26. The hood side walls are now flexed toward each other and introduced into spaces 31 and the hood is then lowered slightly to effect engagement of its side walls by devices 26 (Figs. 4 and 7).

The apparatus is equipped with electrical devices that will now be described having reference to Figs. 1, 3 and 4. The electrical devices include a flexible conductor cable 40 that is connected at one end to a sheathed conductor cable 41 and that is adapted to be connected at its other end to a suitable source of electrical energy supply (not shown). Cable 41 is connected to a junction box 42 that has a plurality of convenience outlets 43. A second sheathed conductor cable 44 establishes connection between the junction box and an electric lamp unit 45 that is provided with a pull chain 46 for operating an electric switch that is not shown. A third conductor cable 47 is connected at its ends to junction box 42 and an electric heating unit 48 which is supported by case bottom wall 20. Interposed in cable 47 is a manual switch 50. The electric circuit from the junction box to the heating unit includes a thermostatic control 51 comprising a temperature responsive unit 52, a manual adjusting unit 53 and conductor cables 54 and 55.

A cash register 56 is disposed within the housing and is supported by case bottom wall 20. The cash register is positioned with its back wall adjacent case back wall 21. Window 22 permits a customer to view the indicia which signifies the dollar amount registered by the cash register for a particular transaction. Thermostatic unit 52 is removably connected to the back wall of the cash register and projects into the interior thereof. The cash register may be of any conventional mechanical or electro-mechanical type. If the cash register is in the electro-mechanical category, it may be electrically connected to one of the convenience outlets 43.

For the purpose of outlining the operation of the illustrated embodiment of the invention, it is first assumed that the apparatus is assembled and that the parts are in the relative position shown in Figs. 1, 2 and 3 with hood 17 closed. It is also assumed that switch 50 is in "off" position. The apparatus may be readily rolled to any selected out of door location. Conductor cable 40 is connected to a suitable source of electric energy supply. Hood 17 is swung from closed position (Fig. 3) to raised position (Figs. 4 and 5) in the manner described earlier herein. With the hood in raised position, an operator has ready access to the cash register and the various switches within the housing.

The cash register is at a level to permit of convenient operation by the operator when standing. Moreover, the hood in raised position extends forwardly beyond the front of the cash register and stand and over the head of the operator. Thus, it will be appreciated that the housing parts afford adequate protection to the cash register and its hood serves to shelter the operator. The hood is so configured and arranged with respect to the case that rain, snow or the like can not enter the housing from the rear whether the hood is in closed or open position. When the hood is in raised position, trough 36 drains off rain water to the sides of the housing.

Lamp unit 45 supplies adequate lighting to the interior of the housing. Heat unit 48 is placed in service by actuating switch 50. The heating unit is, of course, to be used only during low temperature periods to insure proper functioning of the moving parts of the cash register. Thermostatic control 51 automatically places the heating unit out of active service when the interior of the cash register attains a predetermined temperature. We recommend that the thermostatic control be adjusted to place the heating unit out of service when the temperature within the cash register is within the range of 60° to 80° F.

The height, width and/or depth of the housing may be increased in order that the housing may accommodate additional items of equipment and afford shelter for more than one operator, if desired. Also, the front, back and sides of the stand may be enclosed so as to protect merchandise that may be placed on the shelves.

From the foregoing, it is thought that the construction, operation, and advantages of the herein described invention will be apparent to those skilled in the art, without further description; and, it will be understood that various changes in the size, shape, proportion and minor details of construction may be resorted to without departing from the spirit, or sacrificing any of the advantages of the invention.

We claim:

1. In apparatus of the character described, a housing comprising a case and a hood, said case being open at the front and top and including a bottom wall, an upstanding rear wall and a pair of spaced parallel upstanding side walls having the general configuration of a sector, said hood being open at the bottom and back and including a pair of spaced parallel upstanding side walls also having the general configuration of a sector and a front wall, at least a portion of the hood front wall being arcuate in longitudinal cross section, the hood side walls being disposed outside the case side walls and the hood front wall extending across the case open front, the upper end of the hood front wall projecting over and beyond the case rear wall, said hood additionally including a trough secured to the lower end of its front wall and extending thereacross, means pivotally connecting the hood to the case in a manner to permit the hood to be swung forwardly to a raised position relative to the case, and means for releasably maintaining the hood in said raised position relative to the case.

2. In apparatus of the character described, a housing comprising a case and a hood, said case being open at the front and top and including a bottom wall, a rear wall and a pair of spaced upstanding side walls, said hood being open at the bottom and back and including a pair of spaced upstanding side walls and a front wall, the hood side walls being disposed outside the case side walls and the hood front wall extending across the case open front, the hood also including a trough secured to the lower end of its front wall and extending thereacross, means pivotally connecting the hood to the case in a manner to permit the hood to be swung forwardly and upwardly to a raised position relative to the case, and means for releasably maintaining the hood in said raised position relative to the case.

References Cited in the file of this patent

UNITED STATES PATENTS

| | | | |
|---|---|---|---|
| 2,497,561 | Rose | Feb. 14, | 1950 |
| 2,651,703 | Atkins | Sept. 8, | 1953 |
| 2,737,754 | Goss | Mar. 13, | 1956 |